(12) United States Patent
Zhang

(10) Patent No.: US 10,911,532 B1
(45) Date of Patent: Feb. 2, 2021

(54) PORT PREDICTION FOR PEER-TO-PEER COMMUNICATIONS

(71) Applicant: WhatsApp Inc., Menlo Park, CA (US)

(72) Inventor: Meng Zhang, Santa Clara, CA (US)

(73) Assignee: WhatsApp Inc., Menlo Park, CA (US)

( * ) Notice: Subject to any disclaimer, the term of this patent is extended or adjusted under 35 U.S.C. 154(b) by 189 days.

(21) Appl. No.: 15/878,006

(22) Filed: Jan. 23, 2018

(51) Int. Cl.
H04L 29/08 (2006.01)
H04N 7/14 (2006.01)

(52) U.S. Cl.
CPC .......... H04L 67/104 (2013.01); H04L 67/141 (2013.01); H04L 67/148 (2013.01); H04N 7/147 (2013.01)

(58) Field of Classification Search
CPC ... H04L 67/104; H04L 67/141; H04L 67/147; H04L 67/148
USPC ....................................................... 709/227
See application file for complete search history.

(56) References Cited

U.S. PATENT DOCUMENTS

| 8,224,985 B2 * | 7/2012 | Takeda | H04L 61/2564 |
| | | | 709/223 |
| 2003/0163697 A1 * | 8/2003 | Pabla | H04L 9/0838 |
| | | | 713/171 |
| 2006/0182100 A1 * | 8/2006 | Li | H04L 61/2578 |
| | | | 370/389 |
| 2014/0241215 A1 * | 8/2014 | Massover | H04L 12/1818 |
| | | | 370/260 |
| 2014/0280989 A1 * | 9/2014 | Borkowski | H04L 67/104 |
| | | | 709/228 |

FOREIGN PATENT DOCUMENTS

EP 2667540 B1 * 11/2017 ............ H04W 12/08

OTHER PUBLICATIONS

Packetworks, Business VoIP—The Benefits, Disadvantages and How It Works, www.packetworks.net, www.packetworks.net/blog/business-voip-the-benefits-disadvantages-and-how-it-works.htm (Year: 2016).*

* cited by examiner

Primary Examiner — Zi Ye
(74) Attorney, Agent, or Firm — Fenwick & West LLP

(57) ABSTRACT

A messaging server establishes a video chat between first and second endpoints through a first and second router. In parallel, the messaging server transmits instructions to the first endpoint causing the first endpoint to transmit packets through a plurality of ports of the first router to a designated port of the second router. In addition, the messaging server transmits instructions to the second endpoint causing the second endpoint to transmit packets through a plurality of ports of the second router to a corresponding plurality of ports of the first router. A P2P connection is established between the first and second endpoints in response to a first port of the plurality of ports of the first router receiving a data packet from the designated port of the second router. The video chat is seamlessly transferred from the connection established through the messaging server to the established P2P connection.

17 Claims, 6 Drawing Sheets

US 10,911,532 B1

PORT PREDICTION FOR PEER-TO-PEER COMMUNICATIONS

BACKGROUND

This invention pertains in general to electronic communications and in particular to establishing peer-to-peer (P2P) connections between client devices in order to exchange the communications.

Users of electronic devices may utilize messaging applications to communicate with each other via video chat. For example, a first user may use a messaging application on a first device to engage in a video chat with a second user using a second device. The video chat may be routed through a messaging server.

Video chats are data intensive. Therefore, such chats require large amounts of network bandwidth and may also require large amounts of processing power. As a result, it is difficult for a messaging server to simultaneously support multiple video chats due to the combined bandwidth and computational requirements.

SUMMARY

In some embodiments, a method for seamlessly transferring a video chat between first and second endpoints from a connection established through a messaging server to a P2P connection between the first and second endpoints is provided. The method comprises establishing a connection between the first endpoint and the second endpoint through the messaging server, the connection established through the first router corresponding to the first endpoint and the second router corresponding to the second endpoint. The method further comprises transmitting, from the messaging server to the first endpoint, a first set of instructions indicating one or more parameters of the second router, the first set of instructions configured to cause the first endpoint to transmit packets through a plurality of ports of the first router to a designated port of the second router. The method further comprises transmitting, from the messaging server to the second endpoint, a second set of instructions indicating one or more parameters of the first router, the second set of instructions configured to cause the second endpoint to transmit packets through a plurality of ports of the second router to a corresponding plurality of ports of the first router, wherein a P2P connection is established between the first and second endpoints through the first and second routers in response to a first port of the plurality of ports of the first router receiving a data packet from the designated port of the second router. In response to the establishment of the P2P connection, the messaging server transfers the video chat from the connection established through the messaging server to the established P2P connection.

Figure 1:
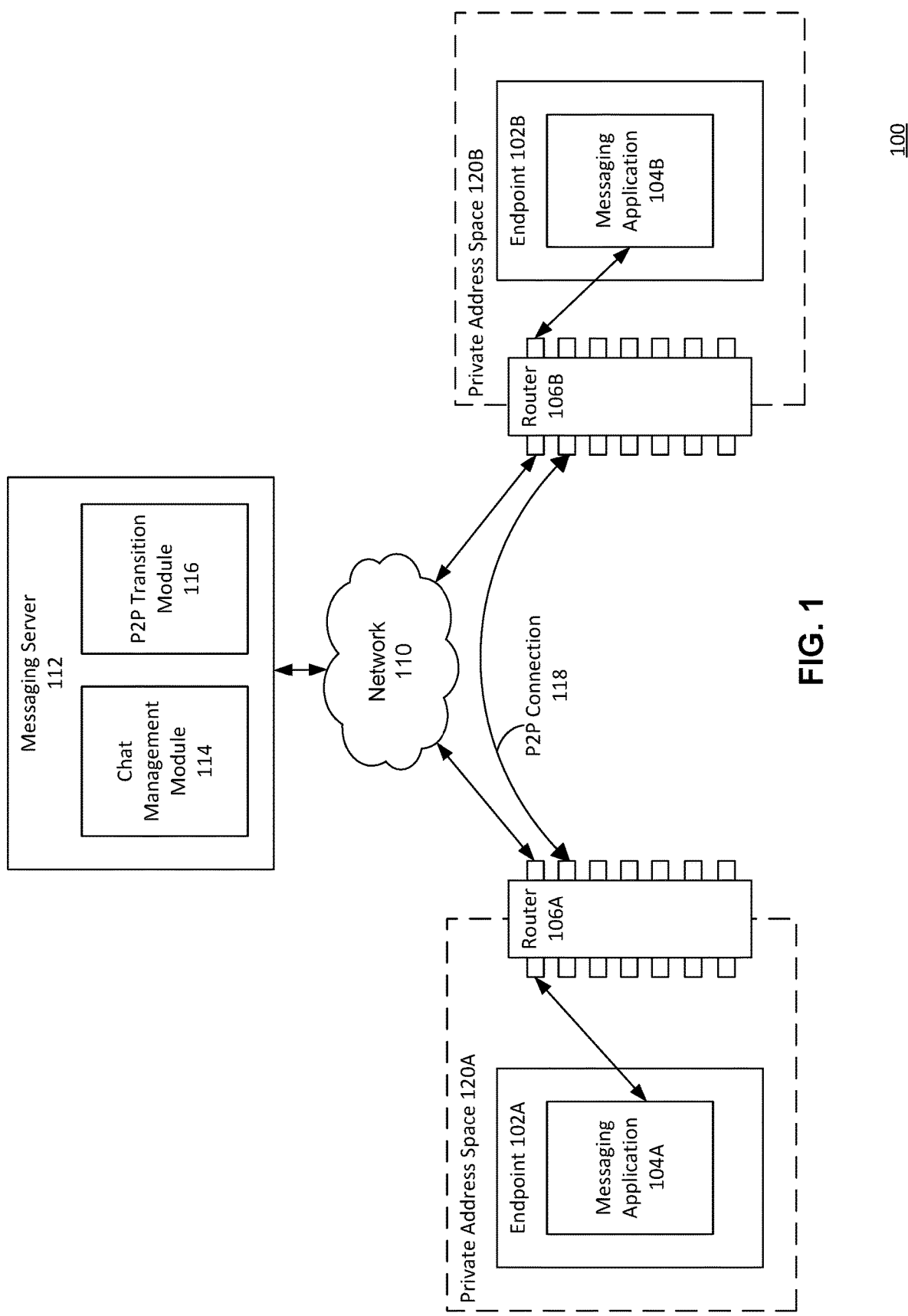
FIG. 1 is a high-level block diagram of a computing environment for establishing peer-to-peer connections between endpoints, in accordance with one embodiment.

The figures depict an embodiment of the invention for purposes of illustration only. One skilled in the art will readily recognize from the following description that alternative embodiments of the structures and methods illustrated herein may be employed without departing from the principles of the invention described herein.

The figures herein use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral. For example, "102" in the text refers to reference numerals "102A" and/or "102B" in the figures.

DETAILED DESCRIPTION

FIG. 1 is a high-level block diagram of a computing environment 100 for establishing peer-to-peer (P2P) communication between endpoints, in accordance with some embodiments. FIG. 1 illustrates first 102A and second 102B endpoints and a messaging server 112 in communication via a network 110. The endpoints 102 are connected to the network 110 by respective first 106A and second 106B routers. In some embodiments, the endpoints 102 are configured to initially establish a communication channel (e.g., to conduct a voice or video chat) with each other through the messaging server 112. In order to reduce an amount of network bandwidth that needs to be managed by the messaging server 112, the messaging server is configured to transmit instructions to the endpoints 102 to prompt the endpoints to establish a P2P connection 116 with each other, and transfer the communication between the endpoints 102 to the established P2P connection.

The network 110 exchanges electronic data among the endpoints 102, routers 106, messaging server 112, and/or other entities. The network 110 may comprise any combination of local area and/or wide area networks, using both wired and/or wireless communication systems. In one embodiment, the network 110 comprises the Internet and uses standard communications technologies and/or protocols. For example, the network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any suitable format, such as hypertext markup language (HTML) or extensible markup language (XML). In some embodiments, all or some of the communication links of the network 110 may be encrypted using any suitable technique or techniques.

An endpoint 102 is an electronic device used by a user to perform functions such as communicating with other users of other endpoints, executing software applications for various purposes, and consuming electronic content such as content hosted by web servers on the network 110. For example, the endpoint 102 may be a smart phone, or a tablet, notebook, or desktop computer. In addition, the endpoint 102 may be an Internet-of-Things (IoT)-connected device such as a home appliance. The endpoint 102 includes, and/or is coupled to, a speaker and display using which the user may view audio-visual content such as video chats. In addition, the endpoint 102 includes a user interface (UI), such as physical and/or on-screen buttons, which the user may interact with to perform various functions with the endpoint. Endpoints 102 may also be referred to as client devices.

The endpoint 102 may execute one or more applications that extend the functionality of the endpoint. The applications may include a web browser that allows the endpoint 102 to interact with websites provided by servers connected to the network 110. The applications may also include one or more applications for interacting with the messaging server 112 and other endpoints. One of these applications may be, or may include, the messaging application 104.

The messaging application 104 provides electronic messaging functionality to the user of the endpoint 102. The messaging functionality includes video chats. A video chat is a multimedia communication session between two or more participants in which the participants exchange streams of video and audio information (called "video streams" herein for clarity). Thus, the participants can see and hear the other participants in a video chat session. The video chat may use voice over internet protocol (VOIP)-based techniques to support the communications.

In one embodiment, the messaging application 104 communicates with the messaging server 112 via the network 110 to establish the video chat with the messaging application 104 of another endpoint 102. The video streams for the chat may initially be routed through the messaging server 112. While the video chat is ongoing, the messaging applications 104 of the endpoints 102 negotiate a P2P connection, and then transition to video streams routed P2P 116 between the endpoints rather than routed through the messaging server 112.

Each router 106 connects its corresponding endpoint 102 to the network 110. For example, the router 106 and endpoint 102 may be configured such that all data exchanged between the endpoint 102 and external sources (e.g., the network 110) must pass through the router 106. Generally speaking, the router 106 forwards outbound traffic from the endpoint 102 (and messaging application 104) to destination locations on the network 110 and forwards inbound traffic from the network 110 to the endpoint 102. The router 106 also performs network address translation (NAT). The router maintains a private IP address space 120 behind the router (i.e., on the side of the router opposite the network 110) and assigns the endpoint 102 and other devices behind the router IP addresses within the private address space. When the endpoint sends a data packet across the router 106 to the network 110, the router performs NAT to translate the source address of the packet from the private IP address used by the endpoint to a public IP address used by the router on the network.

In addition, the router 106 uses NAT to change the ports used by data that pass through the router. In one embodiment, the router 106 uses a symmetric NAT technique to change ports. According to symmetric NAT, each request from a same internal IP address and port to a specific external destination IP address and port is mapped to a unique external port of the router 106. Requests from the same internal IP address and port to different external IP address/port combinations are mapped to different external ports of the router 106. Therefore, communications from the messaging application 104A to the messaging server 112 will use one external port of the router 106A, while communications from the messaging application 104A to the messaging application 104B on another endpoint 102B will use a different external port of the router. Subsequent communications between the particular internal source IP/ports and destination IP/ports use the external IP/port combinations previously assigned by the router 106.

In one embodiment, the router 106 uses a progressive technique to select the unique external port of the router used to send outgoing data. The progressive technique changes the port number by a predetermined amount for each new outgoing connection. For example, the router 106 may increment the port number by a fixed amount (e.g., 1, 5, or 10) for each new connection. Thus, if a first outgoing data packet establishing a new connection is assigned port 10000, a subsequent outgoing data packet establishing a new connection may be assigned port 10001, 10005, or 10010, depending upon the increment amount used by the router 106. A consequence of this progressive technique is that connections established at proximate times tend to use proximate port numbers.

The router 106 selectively forwards or blocks incoming data depending upon whether the router has previously sent data to the source of the incoming data. If an incoming data packet is from an external IP address/port combination to which the router has previously sent data on behalf of an endpoint 102, then the router will accept the data packet and forward it to the internal IP address/port pair of the endpoint 102 that previously sent the data. If an incoming data packet is from an external IP address/port combination to which the router 106 has not previously sent data on behalf of the endpoint 102, the router will drop or otherwise disregard the incoming packet.

For example, assume the endpoint 102A is using the internal IP address 192.168.0.2, the router 106A is using the external IP address 66.220.144.0, and the messaging server 112 is using the external IP address 204.15.20.0. Also assume the messaging application 104A on the endpoint 102A uses internal port 5000 of the router 106A to send a packet to port 10000 of the messaging server 112. In this case, the router 106A receives the packet from the internal IP address/port pair 192.168.0.2/5000 destined for the external IP address/port pair 204.15.20.0/10000. The router 106A changes the source address of the packet to the external IP address of the router and a unique external port, e.g., 66.220.144.0/56723, and forwards the packet to the messaging server 112. The messaging server 112 can reply to the messaging application 104A by sending a packet from the destination IP/address port pair used by the messaging application (204.15.20.0/10000) to the source address for the messaging application as translated by the router 106A (66.220.144.0/56723). The router 106A, upon receiving the packet from the messaging server's IP address/port pair, will forward the packet to the internal IP address/port pair used by the messaging application (192.168.0.2/5000). However, the router 106A will block packets from other IP address/port pairs to the source address for the messaging application as translated by the router 106A (66.220.144.0/56723). Hence, the router 106A will block any packets sent by the second messaging application 104B directed to 66.220.144.0/56723. More succinctly, the second messaging application 104B cannot use the same IP address/port pair used by the messaging server 112 to communicate with the first messaging application 104A.

The messaging server 112 interacts with the endpoints 102 via the network 110 to provide video chat services. The messaging server 112 is remote from the endpoints 102 and may be implemented using one or more dedicated computers and/or a cloud computing platform. The messaging server 112 may be dedicated to providing video chat services, may provide additional services, or may be integrated into a platform that also provides other services. In the illustrated embodiment, the messaging server 112 includes a chat management module 114 and a P2P transition module 116. Other embodiments may include different or other modules, and may distribute functions among the modules in a different manner than described herein.

The chat management module 114 establishes and supports video chat sessions for users of the endpoints 102. The chat management module 114 interacts with the messaging applications 104 of the endpoints 102 for this purpose. For example, the chat management module 114 may provide an application programming interface (API) accessible via the network 110 by which the messaging applications 104 on the endpoints 102 can initiate and maintain video chat sessions. The chat management module 114 receives messages from messaging applications 104 of endpoints 102 requesting to conduct video chats with other endpoints. The chat management module 114 relays these requests among the endpoints 102 and establishes video chat sessions if the requests are accepted.

For example, the chat management module 114 may receive a request from the user of endpoint 102A to conduct a video chat with the user of endpoint 102B. In response to the request, the chat management module 114 sends video chat join requests to the messaging application 104B of endpoint 102B. The user of endpoint 102B interacts with the messaging application 104B to either accept or decline to join the chat. Assuming the user of endpoint 102B joins, the chat management module 114 establishes a video chat session between the users of the endpoints 102A and 102B.

The chat management module 114 establishes and supports video chat sessions by exchanging video streams among the endpoints 102 of the chat participants. In one embodiment, the chat management module 114 initially receives video streams from the source endpoints 102 and distributes the streams to the recipient endpoints. Exchanging the streams in this server-based manner is computationally expensive. The chat management module 114 typically supports many simultaneous video chat sessions, and significant computing resources of the messaging server 112 are required to support the sessions. In addition, server-based video chat causes the messaging server 112 to consume a large amount of network bandwidth. Every video chat requires the exchange of at least two video streams, and the messaging server 112 must receive and redistribute each stream over the network 110.

The P2P transition module 116 addresses the technical issues described above by switching video chats from server-based connections to P2P connections 118. In a P2P connection, the video streams are exchanged directly by the messaging applications 104 of the endpoints 102 via the network 110 over the P2P connection 118, without passing the streams through the messaging server 112. Therefore, computational and bandwidth requirements of the messaging server 112 are reduced. As a result, the messaging server 112 is utilized more efficiently, and a given instance of the messaging server 112 can support a greater number of simultaneous video chats.

In one embodiment, the P2P transition module 116 communicates with the chat management module 114 to detect when video chats between endpoints 102 are initiated. The P2P transition module 116 communicates with the messaging applications 104 of the endpoints 102 engaged in the video chats via the network 110, and causes the endpoints 102 to negotiate a P2P connection 118 between them. Due to the NATs performed by the routers 106 of the respective endpoints 102, the messaging applications 104 at first cannot directly communicate. Specifically, the messaging applications 104 cannot use the same IP address/port pairs used by the messaging server 112 to communicate with other messaging applications 104, because the routers 106 will block the communications due to NAT (because the endpoints 102 use different IP address/port pairs than used by the messaging server 112).

To overcome this hurdle, the P2P transition module 116 causes each messaging application 104 engaged in a video chat to cause its respective endpoint 102 to send data packets to particular ports of the router used by the other endpoint. For example, messaging application 104A causes endpoint 102A to send data packets via the router 106A to a particular port or ports of the router 106B used by endpoint 102B and messaging application 104B and vice versa. The particular ports are derived from the port used by the messaging server 112 to communicate with the endpoints 102, and selected based on the assumption that the routers are using a progressive technique to select port numbers. When the first router 106A uses a particular source IP address/port pair to send a data packet to a destination IP address/port pair of the second router 106B, and the second router 106B previously used that destination pair to send a packet to the source pair of the first router 106A, then the second router 106B will pass the data packet to the messaging application 104B of the endpoint 102B, allowing for the P2P connection 118 to be established. At this point, the two messaging applications 104 can directly communicate via the network 110 through the P2P connection 118 instead of through the messaging server 112. The P2P transition module 116 then seamlessly switches the video chat from being server-based to the established P2P connection 118.

Figure 2:
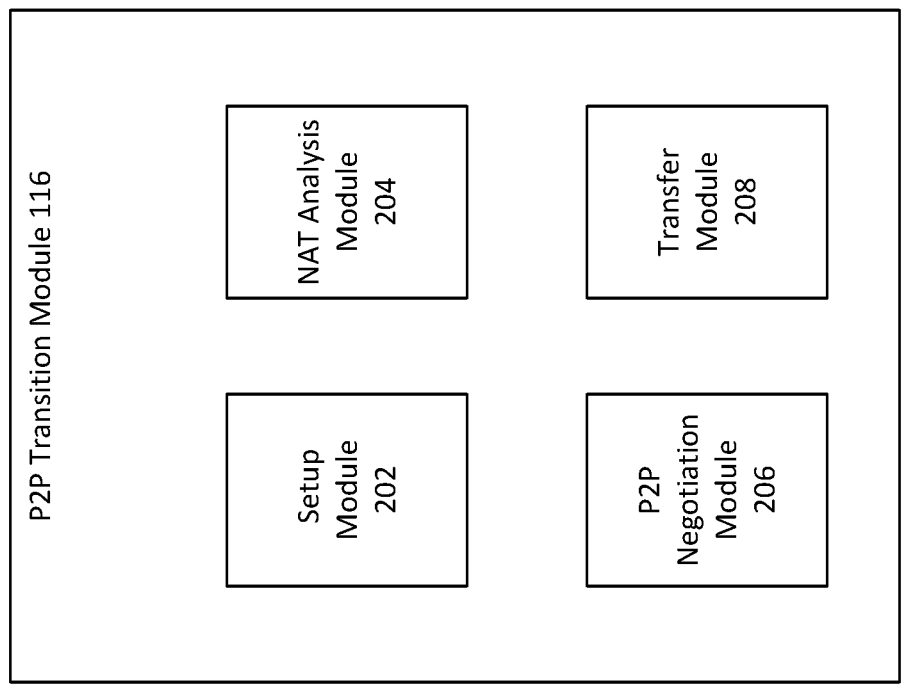
FIG. 2 illustrates a high-level block diagram of the P2P transition module of the messaging server, in accordance with some embodiments.

FIG. 2 illustrates a high-level block diagram of the P2P transition module 116 of the messaging server 112, in accordance with some embodiments. The P2P transition module 116 includes a setup module 202, a NAT analysis module 204, a P2P negotiation module 206, and a transfer module 208. Other embodiments of the P2P transition module 116 may include different and/or additional modules than those described herein. In addition, the functions may be distributed among the modules in a different manner. For example, in some embodiments, the setup module 202 is implemented by the chat management module 114 instead of the P2P transition module 116.

The setup module 202 is configured to establish an initial connection between the endpoints 102A and 102B through the messaging server 112. In some embodiments, the setup module 202 receives a request from a first endpoint (e.g., endpoint 102A) to initiate a video chat with a second endpoint (e.g., endpoint 102B). In some embodiments, the request indicates a user that is associated with the second endpoint 102B.

In some embodiments, the setup module 202 identifies the second endpoint 102B based upon the request received from the first endpoint 102A. For example, a user at each endpoint 102 may log into a respective messaging application 104. The setup module 202 receives login information from each messaging application 104, and determines which users are logged in on which endpoints 102. In response to receiving the request from the first endpoint 102A, the setup module 202 identifies the second endpoint 102B based upon a user identifier indicated in the request. For example, a first user of the first endpoint 102A may send a request by indicating on a user interface a desire to start a video chat with a second user, whereupon the setup module 202, in response to receiving the request, determine that the second user is logged into the messaging application 104B on the second endpoint 102B.

The setup module 202, upon identifying the endpoints 102 associated with the request, connects to and establishes a communication channel between the first endpoint 102A with the second endpoint 102B, allowing for data (e.g., video streams) to be exchanged between the first and second endpoints via the chat management module 114 on the messaging server 112.

In order to facilitate the establishment of a P2P connection 118 between the endpoints 102, the NAT analysis module 204 is configured to determine one or more parameters associated with each of the routers 106 associated with the endpoints 102. For example, if each of the routers 106 uses a symmetric progressive NAT policy, the NAT analysis module 204 determines a current base port used by each of the routers 106 to connect to the chat management module 114 on the messaging server 112, as well as a port increment value associated with each router 106. These parameters may be used to predict a subsequent port likely to be used by the router 106 to allow for the endpoint 102 to communicate with other external sources (within a limited time window). For example, if the first router 106A uses progressive symmetric NAT, is currently connecting the endpoint 102A to the messaging server via an external base port 1000, and has a port increment value of 10, then the router 106A may assign the external port 1010 to the endpoint 102A for communicating with a subsequent external source (e.g., the endpoint 102B). In some embodiments, the NAT analysis module 204 further determines a port range, indicating a range of external ports of each router 106 that may be tried by the endpoints 102 in attempting to establish a P2P connection.

In some embodiments, the NAT analysis module 204 determines one or more parameters of the router 106 based upon an exchange of a plurality of data packets with the router 106 transmitted to and from different ports of the messaging server 112. For example, the NAT analysis module 204 may exchange a series of multiple data packets with the router 106 and its corresponding endpoint 102, in order to determine whether the router 106 is symmetric (e.g., if the data packets from the endpoint 102 transmitted to different ports of the messaging server 112 go through different external ports of the router 106) and progressive (e.g., based upon a determined increment between the external ports used by the router 106 to communicate with different ports of the messaging server 112).

The P2P negotiation module 206 is configured to receive the router parameter information from the NAT analysis module 204, and send instructions to each of the endpoints 102 to cause the endpoints 102 to attempt to establish a P2P connection between them, based upon the determined router parameters. For example, the P2P negotiation module 206 sends instructions to each endpoint 102 to cause each of the corresponding routers 106 to transmit a plurality of data packets to the opposite router (referred to as a "volley"), described in greater detail below. The instructions sent to each endpoint 102 may comprise information indicating one or more ports of the opposite router to which the volley is to be sent, or information indicating the determined router parameters associated with the opposite router to the endpoint, usable by the endpoint to determine one or more ports of the opposite router to each to send the volley.

The transfer module 208 is configured to, in response to an indication that the endpoints 102 have established a P2P connection between them, transfer the exchange of data between the first and second endpoints 102A and 102B from the connection through the chat management module 114 of the messaging server 112 to the established P2P connection.

In some embodiments, a quality or rate of the exchange of data may be increased when implemented through the P2P connection. For example, because the messaging server 112 may need to be able to manage video chats between a large number of different endpoints, the initial connection between the first and second endpoints 102A and 102B through the messaging server 112 may be configured to transmit video chat data between the endpoints 102 at a first, lower rate. On the other hand, the P2P connection established between the endpoints 102 is configured to transmit video chat data between the endpoints 102 at a second, higher rate. In some embodiments, the transition of the video chat from the initial connection through the messaging server 112 (also referred to as a "low-rate connection") to the established P2P connection (also referred to as a "high-rate connection") may be implemented seamlessly, such that the users at each endpoint 102 do not experience an interruption in video chat services during the transition, and such that the transition is implemented without requiring any input from the users of the endpoints 102. In some embodiments, video chat data transmitted through the messaging server 112 is transmitted at a first quality level, while video chat data transmitted through the P2P connection 118 is transmitted at a second quality level that is higher than the first quality level.

Figure 3:
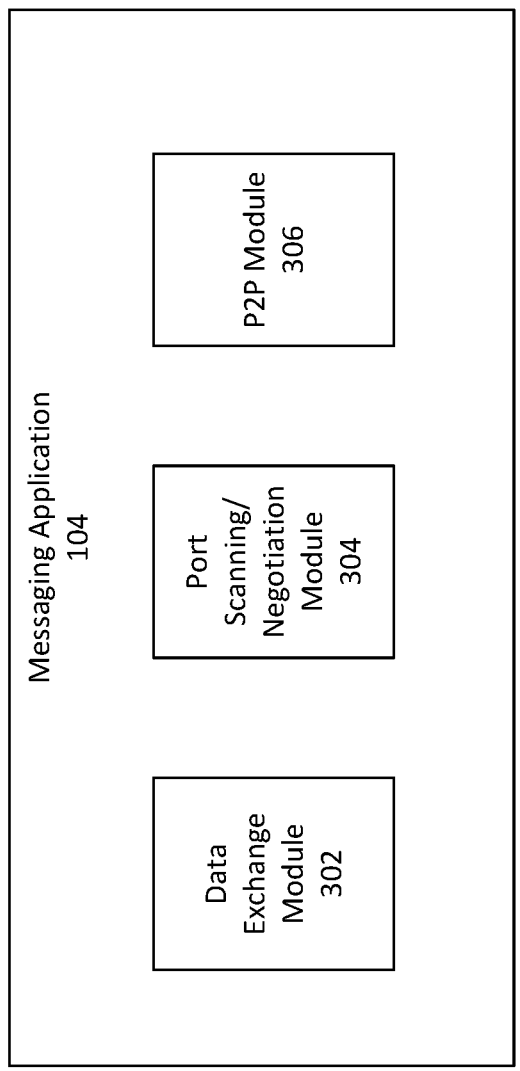
FIG. 3 illustrates a high-level block diagram of a messaging module in a messaging server, in accordance with some embodiments.

FIG. 3 illustrates a high-level block diagram of a messaging application 104 installed on an endpoint 102, in accordance with some embodiments. As illustrated in FIG. 3, the messaging application 104 comprises a data exchange module 302, a port scanning/negotiation module 304, and a P2P module 306. Other embodiments of the messaging application 104 may include different and/or additional modules than those described herein. In addition, the functions may be distributed among the modules in a different manner.

The data exchange module 302 is configured to manage the exchange of data between the messaging application 104 and other messaging applications 104 installed on other endpoints 102. For example, messaging applications 104 installed on different endpoints 102 may exchange audio and/or video data as part of a video chat conducted between the users of the endpoints 102. The following discussion regarding the messaging application 104 may refer to the messaging application as corresponding to the messaging application 104A installed on the first endpoint 102A, although it is understood that the messaging application 104B installed on second endpoint 102B may have a substantially similar structure.

In some embodiments, the data exchange module 302 receives one or more inputs from a user of the endpoint 102A requesting a video chat to be initiated with another user (e.g., the user associated with the second endpoint 102B), and connects the endpoint 102A to the messaging server 112 to establish a connection with the endpoint 102B corresponding to the requested user, the connection being managed by the chat management module 114. In some embodiments, the data exchange module 302 determines an identifier corresponding to the second endpoint 102B based upon a received indication of the user of the second endpoint 102B (e.g., a username). In some embodiments, the data exchange module 302 transmits a request corresponding to the received input to the setup module 202 on the messaging server 112, and receives in response the identifier corresponding to the second endpoint 102B.

Once a connection with the second endpoint 102B is established through the messaging server 112, the data exchange module 302 manages the transmission and receipt of data with the second endpoint 102B over the established connection. In some embodiments, if a direct P2P connection 118 is established between the endpoints 102, the data exchange module 302 may coordinate with the P2P module 206 to transfer the exchange of data with the second endpoint 102B from the connection through the messaging server 112 to the established P2P connection 118. In some embodiments, a rate at which the data exchange module 302 transmits or receives data with the destination endpoint may be based upon a type of connection with the destination endpoint (e.g., a low rate when the connection is through messaging server 112, and a high rate once the connections is transferred to the P2P connection 118).

The port scanning/negotiation module 304 is configured to receive instructions from the P2P negotiation module 206 on the messaging server 112, and to transmit data packets through the router 106A as part of a volley to attempt to establish a P2P connection with the second endpoint 102B through the router 106B. The received instructions may include connection information comprising one or more parameters associated with the second router 106B corresponding to the second endpoint 102B, such as a base port of the second router 106B used by the second endpoint 102B to connect to the messaging server 112, a port increment amount associated with the second router 106B (e.g., if the destination router uses a progressive symmetrical NAT policy), a port range, and/or the like. The port range may correspond to range of ports on the second router 106B that the first endpoint 102A will attempt to establish the P2P connection through (using the received increment value).

In some embodiments, the port scanning/negotiation module 304 uses the received instructions to determine one or more candidate ports of the second router 106B that may be used to establish a P2P connection with the second endpoint 102B. In some embodiments, the candidate ports may comprise a series of external ports of the router 106B successively incremented from the base port by the port increment amount. For example, if the base port used by the second router 106B to connect to the server 112 is port number 1000, and the port increment amount is 4, the determined one or more candidate ports may comprise the ports 1004, 1008, 1012, etc. In addition, in some embodiments, the port scanning/negotiation module 304 may determine one or more candidate ports of its own router (i.e., first router 106A), each candidate port corresponding to a possible port that may be used by the first router 106A to establish the P2P connection with the second router 106B. The number of candidate ports determined may correspond to a predetermined number, or may be defined by the port range.

The port scanning/negotiation module 304 generates and transmits data packets through the first router 106A to cause the first router 106A to transmit a volley of data packets to the second router 106B, in an attempt to form a P2P connection with the second endpoint 102B. For example, the port scanning/negotiation module 304 may transmit a plurality of data packets through different internal ports of the first router 106A to the same port of the second router 106B (e.g., a "many-to-one" volley) or each to different ports of the second router 106B (e.g., a "many-to-many" volley). Types of volleys that may be transmitted are described in greater detail below in relation to FIG. 4.

In some embodiments, each router 106 transmits from one or more ports a volley of data packets to one or more port of the opposite router to attempt to establish a P2P connection 118 between the endpoints 102A and 102B. If a first port of the first router 106A transmits a data packet from the first endpoint 102A as part of its volley to a second port on the second router 106B and receives a data packet transmitted by the second endpoint 102B from the second port on the second router 106B, the first router 106A is able to accept the transmitted packet under its NAT policy. The port scanning/negotiation module 304 receives from the router 106A identifiers corresponding to the first and second ports, which can be used to establish the P2P connection 118 between the endpoints 102A and 102B through the routers 106A and 106B.

On the other hand, if a connection is unable to be established (e.g., none of the ports on the first router 106A that transmitted a data packet as part of a volley received a data packet from the external port on the second router 106B that they transmitted the data packet to), the port scanning/negotiation module 304 may determine a new set of one or more candidate ports, and transmit further data packets as part of a subsequent volley in an attempt to establish a P2P connection. In some embodiments, the port scanning/negotiation module 304 may receive updated connection information from the P2P negotiation module 206 on the messaging server 112 (e.g., an updated base port of the second router 106B). In some embodiments, the port scanning/negotiation module 304 receives new connection information from the P2P negotiation module 206 only after it has attempted to establish a P2P connection through all candidate ports of the second router 106B (e.g., ports of the second router 106B separated from the base port by a multiple of the port increment value) within a received port range.

The P2P module 306 is configured to, in response to a successful communication of the messaging apps 104 through the first and second routers 106A and 106B, establish a P2P connection (e.g., the P2P connection 118) between the first endpoint 102A and the second endpoint 102B. In some embodiments, the P2P connection 118 is implemented using the first and second ports identified by port scanning/negotiation module 304. Once the P2P connection 118 is established, the P2P module 306 may coordinate with the data exchange module 302 to transfer the exchange of video chat data from the connection through the messaging server 112 to the established P2P connection 118.

Figure 4:
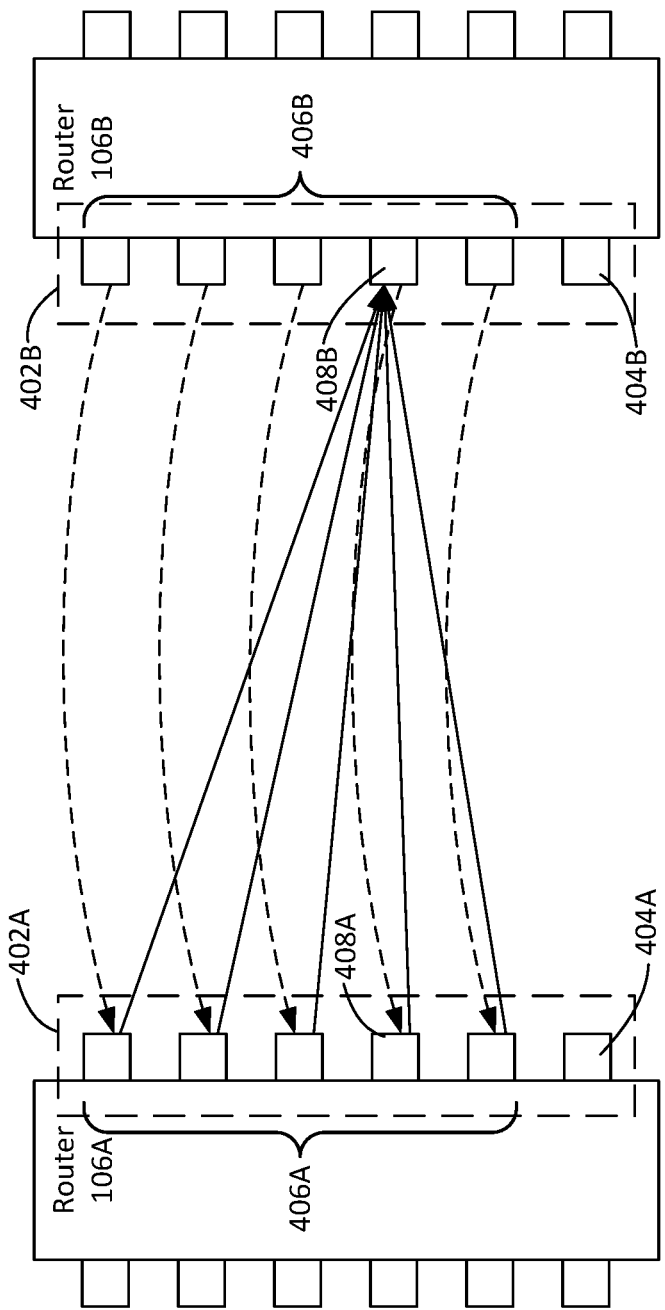
FIG. 4 illustrates a diagram of communications between a pair of routers attempting to establish a P2P connection, in accordance with some embodiments.

FIG. 4 illustrates a diagram of communications between the pair of routers 106A and 106B attempting to establish a P2P connection, in accordance with some embodiments. As illustrated in FIG. 4, each of the routers 106A and 106B comprises a plurality of external ports 402A and 402B.

The external ports 404A and 404B correspond to the base ports used by the routers 106A and 106B to connect their respective endpoints 102A and 102B to the messaging server 112 (not shown in FIG. 4). Although FIG. 4 illustrates a certain number of external ports 402 for each of the routers 106A and 106B, it is understood that the routers have a large number of ports. Each of the external ports may be designated by a port number, wherein the numbers of adjacent illustrated ports are separated by a designated port increment value. For example, each pair of adjacent external ports of the router 106A illustrated in FIG. 4 is separated by a first port increment value for the router 106A. The external ports 402 illustrated in FIG. 4 may correspond to the external ports of the routers 106 within a port range for each router. As illustrated in FIG. 4, external ports 402A/B being "lower" on their respective router 106A/B correspond to lower port numbers, while external ports 402A/B that are higher correspond to higher port numbers.

Each of the endpoints 102 (not shown) sends data packets through their respective routers 106A and 106B as part of a volley of data packets transmitted to one or more external ports 402 of the opposite router 106. In some embodiments, one of the routers 106 transmits a "many-to-one" volley, while the other router 106 transmits a "many-to-many" volley. For example, as illustrated in FIG. 4, the first router 106A sends a "many-to-one" volley to the second router 106B (illustrated using solid lines), while the second router 106B transmits a "many-to-many" volley to the first router 106A (illustrated using dashed lines).

To transmit the "many-to-one" volley, the messaging application 104A of the first endpoint 102A transmits data packets from a plurality of different internal ports to a particular port of the second router 106B (referred to as the designated candidate port 408B), based upon the router parameters received from the messaging server 112. As such, the router 106A will transmit a data packet from each of a plurality of external ports 406A (also referred to as candidate ports 406A) to the single designated candidate port 408B of the second router 106B.

In some embodiments, the candidate ports 406A from which the first router 106A transmits its volley correspond to a series of ports following the base port 404A (e.g., the port used to communicate with the messaging server 112), each separated by the port increment value of the first router 106A. For example, if the base port 404A has a port number 1000, and the first router 106A has a designated port increment value of 5, then the candidate ports 406A may comprise the external ports of the first router 106A having the port numbers 1005, 1010, 1015, etc. In some embodiments, the candidate ports 406A includes a predetermined number of ports. In other embodiments, the candidate ports 406A includes all candidate ports within a port range.

The designated candidate port 408B of the second router 106B may correspond to a port of the second router 106B separated from the base port 404B (e.g., the port used by the second router 106B to communicate with the server 112) by an amount based upon the designated port increment value for the second router 106B. For example, if the base port 404B has a port number 1500, and the second router 106B has a designated port increment value of 10, then the designated candidate port 408B may correspond to the external port of the second router 106B having a port number that is a multiple of 10 and higher than 1500 (e.g., 1510, 1520, or 1530). In some embodiments, the designated candidate port 408B corresponds to any external port of the second router 106B that the port scanning/negotiation module 304 of the endpoint 102A determines to be likely used by the second router 106B for establishing a P2P connection with the first router 106A. As each of the routers 106A and 106B is configured to transmit a volley from a plurality of candidate external ports 406A and 406B, the first endpoint 102A may select the designated candidate port 408B to correspond to an external port expected to be in the middle of the range of candidate ports that the first endpoint 102A expects that the second router 106B will use when transmitting its volley, in order to maximize a probability that the designated candidate port 408B will actually be used by the second router 106B when transmitting its volley.

The "many-to-one" volley transmitted by the first router 106A may be referred to as a "bet," in that the first endpoint 102A is betting that the second endpoint 102B will use the designated candidate port 408B of the second router 106B to attempt form a P2P connection with the first endpoint 102A (e.g., as part of a transmitted volley to the first router 106A).

Because the messaging application 104B of the second endpoint 102B has no knowledge of which specific external port the first endpoint 102A is betting on, the second endpoint 102B transmits through the second router 106B a "many-to-many" volley to the external ports of the first router 106A to attempt to establish a P2P connection. To transmit the "many-to-many" volley, the messaging application 104B of the second endpoint 102B transmits a plurality of data packets from a plurality of different internal ports to a corresponding plurality of external ports of the first router 106A. This causes the second router 106B to transmit data packets from each of a plurality of external ports 406B (also referred to as candidate ports 406B) to a corresponding plurality of external ports of the first router 106A. In some embodiments, the plurality of candidate ports 406B from which the second router 106B transmits its volley may correspond to a series of ports following the base port 404B (e.g., the port used to communicate with the server 112), each separated by the port increment value of the second router 106B. For example, using the example above where the base port 404B has a port number 1500, and the second router 106B has a designated port increment value of 10, then the candidate ports 406B may comprise the external ports 1510, 1520, 1530, etc. of the second router 106B.

The corresponding plurality of ports of the first router 106A being transmitted to in the "many-to-many" volley may correspond to a series of ports following the base port 404A of the first router 106A, each of the series of ports separated by the designated port increment value of the first router 106A and corresponding to a respective candidate port 406B of the second router 106B. In some embodiments, the corresponding ports of the first router 106A may be the same ports as or substantially overlap with the plurality of candidate ports 406A as determined by the first endpoint 102A when transmitting the "many-to-one" volley. For example, if the candidate ports 406B of the second router 106B correspond to the external ports 1510, 1520, 1530, etc., they may correspond respectively to the ports 1005, 1010, 1015, etc. of the first router 106A. The router 106B transmits, from each of the candidate ports of the second router 106B, one or more data packets to each of the corresponding ports of the first router 106A.

In some embodiments, each of the first and second routers 106A and 106B are configured to transmit their respective volleys at substantially the same time, such that each router transmits its volley before receiving the volley transmitted by the other router. A connection can be formed if the designated candidate port 408B of the second router 106B "bet" on by the first router 106A in its "many-to-one" volley is one of the candidate ports 406B used by the second router 106B in transmitting its "many-to-many" volley. As such, the first router 106A transmits from a port 408A of the candidate ports 406A one or more data packets to the designated candidate port 408B of the second router 106B, while the second router 106B transmits from the designated candidate port 408B one or more data packets to the port 408A of the first router 106A.

Because the first router 106A has transmitted data packets from the port 408A before receiving the data packet from the designated candidate port 408B of the second router 106B, the first router 106A is able to accept the transmitted data packets from the second router 106B under its NAT policy. Similarly, the second router 106B is able to accept the data packets transmitted from the port 408A of the first router 106A to the port 408B, because it had previously transmitted at least one packet via the port 408B to the port 408A. As each router 106 is able to accept data packets transmitted from the opposite router through the ports 408, a P2P connection is able to be established between the endpoints 102 through the respective ports 408 of their respective routers 106.

In other embodiments, the first router 106A transmits its volley at a first time, while the second router 106B transmits its volley at a second time after the first time. As such, the first port on the first router 106A may receive a data packet transmitted from the second port of the second router 106B after having transmitted a data packet to the second port of the second router 106B, and is thus able to accept the data packet under its NAT policy to be received by the first endpoint 102A. However, because the data packet from the first port of the first router 106A is transmitted before the data packet from the second port of the second router 106B, the second router 106B may not be able to accept the data packet from the first router 106A. In some embodiments, the first endpoint 102A, upon acceptance of a data packet transmitted from the second router 106B at the first port, may then transmit one or more additional data packets from the first port to the designated port of the second router 106B that can be accepted by the second router 106B.

In some embodiments, the first and second endpoints 102A and 102B are not able to establish a P2P connection through the first and second routers 106A and 106B in response to the transmission of the respective volleys. For example, this may occur if the designated candidate port 408B is not used by the second router 106B in transmitting its "many-to-many" volley, or transmits a data packet as part of the "many-to-many" volley to an external port of the first router 106A that is not one of the candidate ports 406A used by the first router 106A to transmit its "many-to-one" volley. In some embodiments, such misalignments between the candidate ports of the first and second routers 106A and 106B may occur if either the first or second endpoints 102 communicated with additional external sources through their respective routers 106 prior to the transmission of the volleys, causing additional external ports of the routers 106 to be mapped.

In some embodiments, in response to a failure to establish a P2P through the transmission of the volleys, each of the first and second routers 106A and 106B may transmit subsequent volleys to re-attempt establishing a P2P connection. In some embodiments, the first and second endpoints 102A and 102B may determine an updated set of candidate ports for transmitting one or more subsequent volleys. For example, the first endpoint 102A may determine a new designated candidate port of the second router 106B for which to transmit a "many-to-one" volley, based upon the previous candidate port and the port increment value for the second router 106B. In some embodiments, the first and second routers 106 may switch the type of volley transmitted in subsequent volleys (e.g., the first router 106A transmitting a "many-to-many" volley, and the second router 106B transmitting a "many-to-one" volley).

In some embodiments, the endpoints 102 may continue to transmit volleys to attempt to establish a P2P connection, until the first endpoint 102A has attempted transmitting a "many-to-one" volley to all candidate ports of the second router 106B within a port range. In some embodiments, after all candidate ports within the port range have been exhausted, the endpoint 102A may request updated router parameters from the messaging server 112 (e.g., from the port scanning/negotiation module 304) with which to transmit subsequent volleys. The updated router parameters may comprise an updated base port, port increment value, and/or port range associated with the opposite router.

Figure 5:
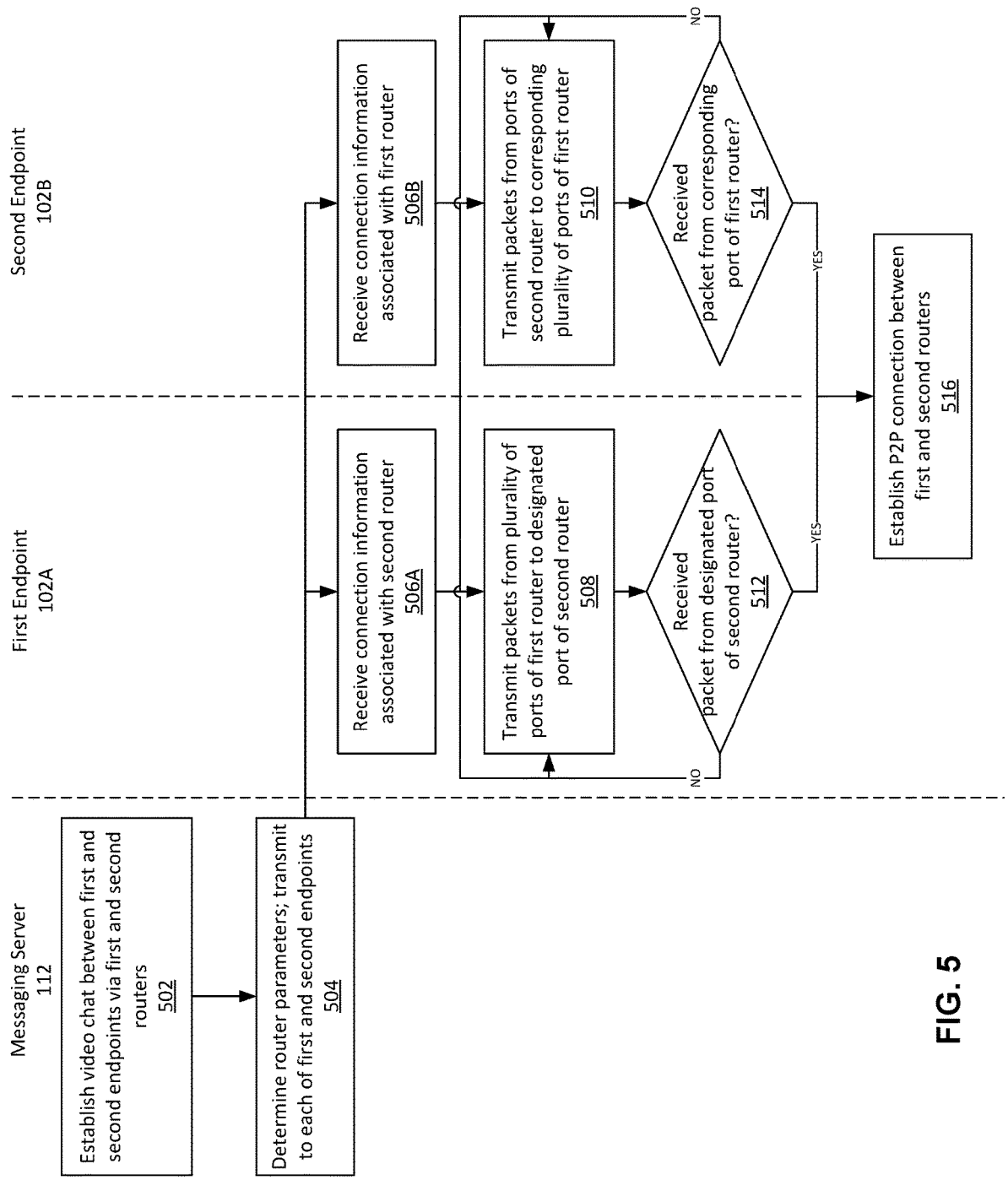
FIG. 5 illustrates a flowchart of a process for establishing P2P communications between endpoints, in accordance with some embodiments.

FIG. 5 illustrates a flowchart of a process for establishing P2P communications between endpoints, in accordance with some embodiments. The messaging server 112 establishes 502 a video chat between the first and second endpoints via the first and second routers 106A and 106B. The video chat may be implemented over a low quality channel, allowing for the messaging server to concurrently manage multiple video chats between a large number of different endpoints with a limited amount of bandwidth.

While the messaging server 112 manages the exchange of video chat data between the first and second endpoints, the messaging server 112 may, in parallel, determine 504 router parameters corresponding to the first router 106A and the second router 106B, and transmits router parameter information to each of the first and second endpoints 102. The router parameter information may comprise a base port, a port increment value, and a port range associated with each router 106. The first endpoint 102A receives 506A connection information associated with the second router 106B from the messaging server 112. The second endpoint 102B receives 506B similar connection information associated with the first router 106A from the messaging server 112.

In response to receiving connection information, the first and second endpoints 102A and 102B each cause their respective router 106 to transmit a volley comprising a plurality of data packets to the opposite router 106, in an attempt to establish a P2P connection with the opposite endpoint 102. The first endpoint 102A transmits 508 through the first router 106A a "many-to-one" volley comprising a plurality of data packets from a plurality of external ports of the first router 106A to a designated port of the second router 106B. The second endpoint 102B transmits 510 through the second router 106B a "many-to-many" volley comprising data packets transmitted from each of a plurality of candidate ports on the second router 106B to a corresponding external port on the first router 106A.

Upon the transmission of both volleys, the first endpoint 102A determines 512 whether it has received a packet from the designated port of the second router 106B at one of the plurality of candidate ports of the first router 106A that transmitted packets to the designated port of the second router 106B. Because each of the candidate ports of the first router 106A had transmitted at least one data packet to the designated port of the second router 106B as part of the "many-to-one" volley, the NAT policy of the first router 106A will be able to accept the packet received from the designated port of the second router 106B. In addition, the second endpoint 102B determines 514 whether it has received, at a candidate port of the second router 106B, a data packet from a corresponding port of the first router 106A.

If both the first and second endpoints 102A and 102B were able receive and accept data packets through their respective router 106A and 106B, then the first and second endpoints establish 516 a P2P connection between the designated port on the second router 106B and its corresponding port on the first router 106A. Once the P2P connection is established, the messaging server 112 coordinates with the endpoints 102A and 102B to transfer the video chat from being connected through the messaging server 112 to the established P2P connection, freeing up bandwidth on the messaging server 112. In addition, because the P2P connection is specific to the particular pair of endpoints 102A and 102B, the data exchange between the endpoints 102A and 102B may be implemented over the P2P connection as a high quality or high bandwidth channel.

On the other hand, if either the first or second endpoints 102A/102B are not able to successfully receive a data packet from the opposite endpoint 102 and router 106, then no P2P connection is established. In some embodiments, each endpoint 102 may transmit one or more subsequent volleys and/or receive updated router parameters pertaining to the opposite router from the messaging server 112, and transmit subsequent volleys based upon the updated router parameters.

By instructing each of the routers 106A and 106B to transmit different types of volleys, the chance that a P2P connection can be established is increased. For example, the first router 106A transmits a "many-to-one" volley to "bet" which external port of the second router 106B is likely available to be used for establishing a P2P connection, while the second router 106B, not knowing the specific external port "bet" on by the first router 106A, transmits a "many-to-many" volley to increase the probability that an external port of the first router 106A that transmitted a data packet to the external port of the second router 106B that was bet on will receive a data packet in reply. By establishing P2P connections and transferring video chat data exchange channels to the established P2P connections, the messaging server 112 is able to reduce an amount of resources needed to set up and manage multiple simultaneous calls between different endpoints, and allow for the data exchange to be carried out with higher quality.

Figure 6:
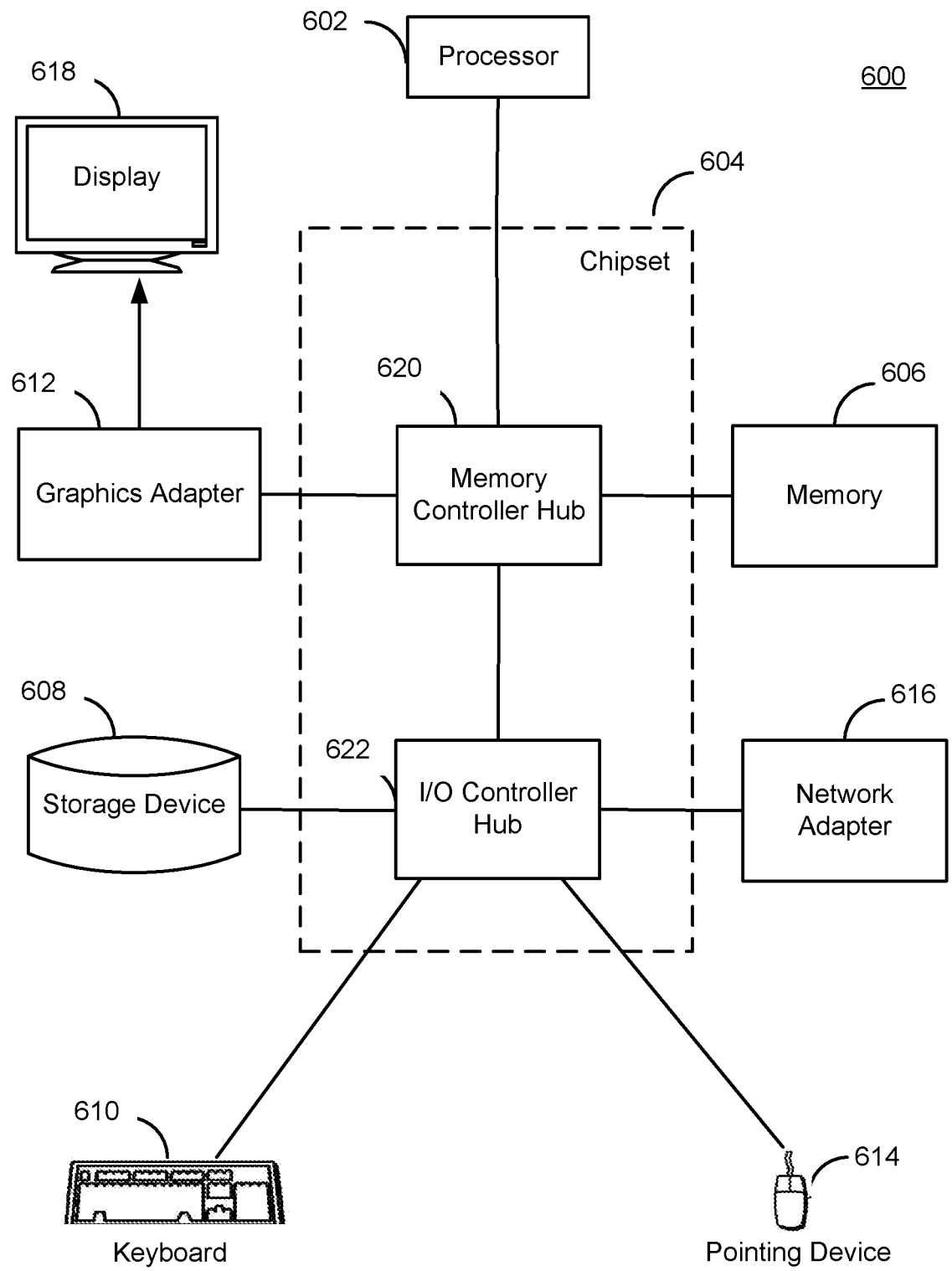
FIG. 6 is a high-level block diagram of a computer for acting as the client or server, in accordance with some embodiments.

The entities shown in FIG. 1 are implemented using one or more computers. FIG. 6 is a high-level block diagram of a computer 600 for acting as an endpoint (e.g., an endpoint 102) or a server (e.g., the server 112) in one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 500. The graphics adapter 612 displays images and other information on the display 618. The network adapter 616 couples the computer system 600 to a network (not shown).

As is known in the art, a computer 600 can have different and/or other components than those shown in FIG. 6. In addition, the computer 600 can lack certain illustrated components. For example, the computer acting as the messaging server 112 can be formed of multiple blade servers linked together into one or more distributed systems and lack components such as keyboards and displays. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method, comprising:
   establishing a connection between a first endpoint and a second endpoint through a messaging server, the connection established through a first router corresponding to the first endpoint and a second router corresponding to the second endpoint;
   managing an exchange of data between the first endpoint and the second endpoint via the connection through the messaging server at a first quality level;
   transmitting, from the messaging server to the first endpoint, a first set of instructions indicating one or more parameters of the second router, the first set of instructions configured to cause the first endpoint to transmit packets through a plurality of ports of the first router to a designated port of the second router, wherein the designated port is determined based upon the one or more parameters of the second router and is within a first port range of the second router;
   transmitting, from the messaging server to the second endpoint, a second set of instructions indicating one or more parameters of the first router, the second set of instructions configured to cause the second endpoint to transmit packets through a plurality of ports of the second router to a corresponding plurality of ports of the first router, wherein a P2P connection is established between the first and second endpoints through the first and second routers if a first port of the plurality of ports of the first router receives a data packet from the designated port of the second router;
   wherein the first set of instructions are further configured to cause the first endpoint to, responsive to the first port of the first router not receiving a packet from the designated port of the second router, transmit packets through the plurality of ports of the first router to a second designated port of the second router within the first port range; and
   responsive to establishing the P2P connection between the first and second endpoints, transferring the exchange of data from the established connection through the messaging server to the established P2P connection, wherein the exchange of data via the established P2P connection is implemented at a second quality level higher than the first quality level.

2. The method of claim 1, further comprising determining, at the messaging server, that the first and second routers each implement a symmetrical network address translation (NAT) policy.

3. The method of claim 1, wherein:
the one or more parameters of the first router comprises an indication of a first base port used by the first router to connect to the messaging server and a first port increment value of the first router, and the one or more parameters of the second router comprises an indication of a second base port used by the second router to connect to the messaging server and a second port increment value of the second router, and wherein the plurality of ports of the first router correspond to a set of ports of the first router each separated by the first port increment value, and wherein the designated port of the second router corresponds to a port of the second router separated from the second base port by the second port increment value.

4. The method of claim 1, further comprising, responsive to the first port of the first router not receiving a packet from the designated port of the second router, transmitting from the messaging server an updated first set of instructions configured to cause the first endpoint to transmit packets through a second plurality of ports of the first router to a second designated port of the second router.

5. The method of claim 1, wherein the first set of instructions further indicates the first port range of the second router that includes the designated port, and
wherein the method further comprises, responsive to the first endpoint failing to establish the P2P connection with a plurality of designated ports within the first port range of the second router, transmitting from the messaging server an updated first set of instructions configured to cause the first endpoint to transmit packets through a second plurality of ports of the first router to an additional designated port of the second router within a second port range of the second router different from the first port range.

6. The method of claim 1, wherein the messaging server transmits the first and second sets of instructions concurrently to managing the exchange of data via the connection through the messaging server.

7. The method of claim 1, wherein the exchange of data corresponds to a video chat session.

8. The method of claim 1, wherein the exchange of data between the first and second endpoints is a voice over internet protocol (VOIP) connection.

9. The method of claim 1, wherein the first and second sets of instructions are configured to cause the first endpoint to transmit packets through the plurality of ports of the first router and the second endpoint to transmit packets through the plurality of ports of the second router within a period of time, such that each of the first and second endpoints transmits its respective packets before the packets transmitted from the other endpoint are received at the first and second routers.

10. A messaging server, comprising:
a processor;
a memory in communication with the processor, the memory storing programming instructions executable by the processor to:
establish a connection between a first endpoint and a second endpoint through a messaging server, the connection established through a first router corresponding to the first endpoint and a second router corresponding to the second endpoint;
manage an exchange of data between the first endpoint and the second endpoint via the connection through the messaging server at a first quality level;

transmit to the first endpoint a first set of instructions indicating one or more parameters of the second router, the first set of instructions configured to cause the first endpoint to transmit packets through a plurality of ports of the first router to a designated port of the second router, wherein the designated port is determined based upon the one or more parameters of the second router and is within a first port range of the second router;

transmit to the second endpoint a second set of instructions indicating one or more parameters of the first router, the second set of instructions configured to cause the second endpoint to transmit packets through a plurality of ports of the second router to a corresponding plurality of ports of the first router, wherein a P2P connection is established between the first and second endpoints through the first and second routers if a first port of the plurality of ports of the first router receives a data packet from the designated port of the second router;

wherein the first set of instructions are further configured to cause the first endpoint to, responsive to the first port of the first router not receiving a packet from the designated port of the second router, transmit packets through the plurality of ports of the first router to a second designated port of the second router within the first port range; and responsive to establishing the P2P connection between the first and second endpoints, transfer the exchange of data from the established connection through the messaging server to the established P2P connection, wherein the exchange of data via the established P2P connection is implemented at a second quality level higher than the first quality level.

11. The messaging server of claim 10, wherein:
the one or more parameters of the first router comprises an indication of a first base port used by the first router to connect to the messaging server and a first port increment value of the first router, and the one or more parameters of the second router comprises an indication of a second base port used by the second router to connect to the messaging server and a second port increment value of the second router, and wherein the plurality of ports of the first router correspond to a set of ports of the first router each separated by the first port increment value, and wherein the designated port of the second router corresponds to a port of the second router separated from the second base port by the second port increment value.

12. The messaging server of claim 10, wherein the programming instructions are further executable by the processor to, responsive to the first port of the first router not receiving a packet from the designated port of the second router, transmit an updated first set of instructions configured to cause the first endpoint to transmit packets through a second plurality of ports of the first router to a second designated port of the second router.

13. The messaging server of claim 10, wherein the first set of instructions further indicates the first port range of the second router that includes the designated port, and
wherein the programming instructions are further executable by the processor to, responsive to the first endpoint failing to establish the P2P connection with a plurality of designated ports within the first port range of the second router, transmit from the messaging server an updated first set of instructions configured to cause the first endpoint to transmit packets through a second plurality of ports of the first router to an additional designated port of the second router within a second port range of the second router different from the first port range.

14. A non-transitory computer-readable storage medium storing computer program instructions executable by a processor to perform operations comprising:
   establishing a connection between a first endpoint and a second endpoint through a messaging server, the connection established through a first router corresponding to the first endpoint and a second router corresponding to the second endpoint;
   managing an exchange of data between the first endpoint and the second endpoint via the connection through the messaging server at a first quality level;
   transmitting, from the messaging server to the first endpoint, a first set of instructions indicating one or more parameters of the second router, the first set of instructions configured to cause the first endpoint to transmit packets through a plurality of ports of the first router to a designated port of the second router, wherein the designated port is determined based upon the one or more parameters of the second router and is within a first port range of the second router;
   transmitting, from the messaging server to the second endpoint, a second set of instructions indicating one or more parameters of the first router, the second set of instructions configured to cause the second endpoint to transmit packets through a plurality of ports of the second router to a corresponding plurality of ports of the first router, wherein a P2P connection is established between the first and second endpoints through the first and second routers if a first port of the plurality of ports of the first router receives a data packet from the designated port of the second router;
   wherein the first set of instructions are further configured to cause the first endpoint to, responsive to the first port of the first router not receiving a packet from the designated port of the second router, transmit packets through the plurality of ports of the first router to a second designated port of the second router within the first port range; and
   responsive to establishing the P2P connection between the first and second endpoints, transferring the exchange of data from the established connection through the messaging server to the established P2P connection, wherein the exchange of data via the established P2P connection is implemented at a second quality level higher than the first quality level.

15. The non-transitory computer-readable storage medium of claim 14, wherein:
   the one or more parameters of the first router comprises an indication of a first base port used by the first router to connect to the messaging server and a first port increment value of the first router, and the one or more parameters of the second router comprises an indication of a second base port used by the second router to connect to the messaging server and a second port increment value of the second router, and
   wherein the plurality of ports of the first router correspond to a set of ports of the first router each separated by the first port increment value, and
   wherein the designated port of the second router corresponds to a port of the second router separated from the second base port by the second port increment value.

16. The non-transitory computer-readable storage medium of claim 14, the operations further comprising, responsive to the first port of the first router not receiving a packet from the designated port of the second router, transmitting from the messaging server an updated first set of instructions configured to cause the first endpoint to transmit packets through a second plurality of ports of the first router to a second designated port of the second router.

17. The non-transitory computer-readable storage medium of claim 14, wherein the first set of instructions further indicates the first port range of the second router that includes the designated port, and
   wherein the method further comprises, responsive to the first endpoint failing to establish the P2P connection with a plurality of designated ports within the first port range of the second router, transmitting from the messaging server an updated first set of instructions configured to cause the first endpoint to transmit packets through a second plurality of ports of the first router to an additional designated port of the second router within a second port range of the second router different from the first port range.

* * * * *